United States Patent
Yoshimoto et al.

(10) Patent No.: US 9,448,137 B2
(45) Date of Patent: Sep. 20, 2016

(54) TEST SYSTEM

(71) Applicant: JTEKT CORPORATION, Osaka-shi, Osaka (JP)

(72) Inventors: Hiroshi Yoshimoto, Nara (JP); Tomoyasu Kada, Kaizuka (JP); Ryouhei Hayama, Nabari (JP); Masaharu Tagami, Kashihara (JP); Aris Maroonian, Nara (JP)

(73) Assignee: JTEKT CORPORATION, Osaka-Shi (JP)

( * ) Notice: Subject to any disclaimer, the term of this patent is extended or adjusted under 35 U.S.C. 154(b) by 0 days.

(21) Appl. No.: 14/223,059

(22) Filed: Mar. 24, 2014

(65) Prior Publication Data

US 2014/0297098 A1    Oct. 2, 2014

(30) Foreign Application Priority Data

Mar. 28, 2013  (JP) .................................. 2013-069254
Apr. 26, 2013  (JP) .................................. 2013-094407

(51) Int. Cl.
*G01M 17/00* (2006.01)
*G06F 7/00* (2006.01)
(Continued)

(52) U.S. Cl.
CPC ........... *G01M 17/007* (2013.01); *G01M 17/00* (2013.01); *B60R 16/0315* (2013.01); *G07C 5/008* (2013.01)

(58) Field of Classification Search
USPC ...... 701/31, 31.4, 31.5, 32.7, 32.8, 99, 33.5, 701/34.3–34.4, 33.7–33.9, 31.1; 434/66; 703/7–8, 23; 73/116.02, 116.06, 73/118.01, 118.02, 865.9, 23.2, 117.01, 73/865.6; 702/116–117, 108, 113, 702/182–185; 340/439, 514, 438
See application file for complete search history.

(56) References Cited

U.S. PATENT DOCUMENTS 4,922,443  A  *  5/1990  Coetsier et al. ............... 702/188
5,388,045  A  *  2/1995  Kamiya .................. B60T 8/885
                                          340/438

(Continued)

FOREIGN PATENT DOCUMENTS

CN         204043925 U  * 12/2014  .......... G01M 17/007
CN         204788977 U  * 11/2015  .......... G01M 17/007
(Continued)

OTHER PUBLICATIONS

The use of simulation models to generate data corresponding to faults in machines; Randall, R.B.; Reliability, Maintainability and Safety, 2009. ICRMS 2009. 8th International Conference on; DOI: 10.1109/ICRMS.2009.5269971; Publication Year: 2009 , pp. 934-939.*

(Continued)

*Primary Examiner* — Cuong H Nguyen
(74) *Attorney, Agent, or Firm* — Oliff PLC

(57) ABSTRACT

A test system includes an actual machine including a test piece that is a mechanical element of a vehicle, the actual machine being installed in a first location; a control device that is installed in the first location, and controls the actual machine; a model installed in a second location away from the first location; and a data processor that is installed in the second location, and is connected to the actual machine or the control device via a communication line so that data communication is performed, the data processor acquiring data from the actual machine via the communication line so that an operation test is performed. The data processor calculates a target value for controlling the actual machine based on an output acquired by inputting the acquired data to the model, and the control device controls the actual machine based on the target value.

6 Claims, 12 Drawing Sheets

(51) Int. Cl.
*G06F 19/00* (2011.01)
*G01M 17/007* (2006.01)
*B60R 16/03* (2006.01)
*G07C 5/00* (2006.01)

(56) References Cited

U.S. PATENT DOCUMENTS

| | | | | |
|---|---|---|---|---|
| 5,526,261 | A * | 6/1996 | Kallis | B60W 10/06 192/3.3 |
| 5,986,545 | A * | 11/1999 | Sanada et al. | 340/439 |
| 6,181,993 | B1 * | 1/2001 | Dale, Jr. | G01B 11/275 33/203.18 |
| 6,304,829 | B1 * | 10/2001 | Whittle et al. | 702/113 |
| 6,516,287 | B1 * | 2/2003 | Freitag | 702/173 |
| 6,687,585 | B1 * | 2/2004 | Rizzoni et al. | 701/34.3 |
| 7,103,460 | B1 * | 9/2006 | Breed | B60C 23/0408 701/29.1 |
| 7,302,329 | B2 * | 11/2007 | McDonald | F04C 15/0061 701/41 |
| 8,321,092 | B2 * | 11/2012 | Browne | B60R 21/013 701/117 |
| 8,676,437 | B2 * | 3/2014 | Yamada | 701/29.6 |
| 8,712,626 | B2 * | 4/2014 | Cahill | B60T 8/1703 701/29.1 |
| 2010/0256860 | A1 * | 10/2010 | Yamada | G07C 5/008 701/29.6 |
| 2010/0286880 | A1 * | 11/2010 | Cahill | B60T 8/1703 701/70 |
| 2012/0035894 | A1 | 2/2012 | Le Salver et al. | |

FOREIGN PATENT DOCUMENTS

| | | | |
|---|---|---|---|
| DE | 197 42 627 A1 | 4/1998 | |
| DE | 197 04 606 A1 | 8/1998 | |
| DE | 19846612 A1 | 4/2000 | |
| DE | 103 03 489 A1 | 8/2004 | |
| JP | A-2006-977 | 1/2006 | |
| JP | 02008070547 A * | 3/2008 | G09B 9/04 |
| JP | A-2009-536736 | 10/2009 | |
| JP | 02010223675 A * | 10/2010 | G01M 17/08 |
| WO | WO 2007/133599 A2 | 11/2007 | |
| WO | 2009/133113 A1 | 11/2009 | |

OTHER PUBLICATIONS

Behavioral Turing test using two-axis actuators; Osawa, H.; Tobita, K.; Kuwayama, Y.; Imai, M.; Yamada, S.; Ro-Man, 2012 IEEE; DOI: 10.1109/ROMAN.2012.6343774; Publication Year: 2012, pp. 328-333; IEEE Conference Publications.*

A new fault classification model for prognosis and diagnosis in CNC machine; Al-jonid, K.; Wang Jiayang; Nurudeen, M. Control and Decision Conference (CCDC), 2013 25th Chinese; DOI: 10.1109/CCDC.2013.6561561; Publication Year: 2013, pp. 3538-3543.*

Comparison between two mixed reality environments as a teleoperation interface; Manuaba, I.B.K.; Taylor, K.; Gedeon, T. Robotics and Automation (ICRA), 2011 IEEE International Conference on; DOI: 10.1109/ICRA.2011.5979828 Publication Year: 2011, pp. 1335-1340.*

Lifetime model research of motor drive system for electric vehicles ;Xuhui Wen; Wei Hu; Tao Fang; Jun Liu; Electrical Machines and Systems, 2007. ICEMS. International Conference on; Year: 2007; pp. 129-132.*

The use of simulation models to generate data corresponding to faults in machines; R. B. Randall; Reliability, Maintainability and Safety, 2009. ICRMS 2009. 8th International Conference on; Year: 2009; pp. 934-939, DOI: 10.1109/ICRMS.2009.5269971.*

Computationally-efficient finite-element-based thermal models of electric machines; Kan Zhou; Jason Pries; Heath Hofmann; Youngki Kim; Tae-Kyung Lee; Zoran Filipi; 2011 IEEE Vehicle Power and Propulsion Conference; Year: 2011 pp. 1-6, DOI: 10.1109/VPPC.2011.6043205.*

Modeling of the hybrid electric drive with an electric power splitter and simulation of the fuel efficiency; Dobri Cundev; Zdenek Cerovsky; Pavel Mindl; Power Electronics and Applications, 2009. EPE '09. 13th European Conference on; Year: 2009 pp. 1-10.*

Extended European Search Report issued in European Patent Application No. 14161659.9 on Aug. 29, 2014.

Jan. 26, 2016 Office Action issued in European Application No. 14161659.9.

* cited by examiner

TEST SYSTEM

INCORPORATION BY REFERENCE

The disclosure of Japanese Patent Applications No. 2013-069254 and 2013-094407 filed on Mar. 28, 2013 and Apr. 26, 2013 including the specification, drawings, and abstract is incorporated herein by reference in its entirety.

BACKGROUND OF THE INVENTION

1. Field of the Invention

The present invention relates to a test system using a network. The present invention also relates to a motion control method for a driving simulator and a vehicle test system.

2. Description of Related Art

With recent advancement of communication networks such as the Internet and intranets, techniques capable of coupling various robots to each other or coupling a robot to an interface via a network have attracted attention (for example, see Japanese Patent Application Publication No. 2006-000977 (JP 2006-000977 A)). An integration test may be carried out with mechanical elements (such as an engine, a transmission, and a steering system, which are hereinafter referred to as "actual machines") of a vehicle disposed in different locations using such communication control techniques. In this case, the test is carried out in a state where a simulated machine capable of simulating an operation of one actual machine is connected to the other actual machine, a simulated machine capable of simulating an operation of the other actual machine is connected to the one actual machine, and the actual machines and the simulated machines are connected to each other via a network to exchange data therebetween and to share the data.

In the test, each simulated machine has to operate in real time on the basis of data acquired from an actual machine operating in another location. FIG. 1 is a diagram schematically illustrating a test system according to related art in which an actual machine A1 and a simulated machine B1 are installed in a place (location 1), a simulated machine B2 and an actual machine A2 are installed in another place (location 2), the simulated machine B1 and the actual machine A1 are mechanically coupled to each other, and the actual machine A2 and the simulated machine B2 are mechanically coupled to each other.

The simulated machine B1 simulates the operation of the actual machine A2 and the simulated machine B2 simulates the operation of the actual machine A1. Accordingly, the simulated machine B1 and the actual machine A2 are connected to each other via a network and the simulated machine B2 and the actual machine A1 are connected to each other via the network.

However, when a simulated machine operates on the basis of data acquired via a network and a communication cycle (which is determined depending on a transmission cycle of a packet) is long, the time corresponding to the communication cycle may be required until an actual machine transmits the next data after transmitting data, the simulated machine cannot update the data during the time, and thus the simulated machine may not correctly simulate the state of the actual machine. Particularly, when a data value to be transmitted by communications rapidly varies, reproduction of the state may not follow the variation well and the test operation may be unstable. In this way, a communication delay has an adverse influence on the entire test system using a network.

A driving simulator includes input devices necessary for driving, such as a steering wheel, an accelerator pedal, a brake pedal, and a shift lever; actuators providing motions such as roll, pitch, and yaw to a driver seat; a monitor that displays a landscape appearing via a vehicle window; and a speaker that reproduces running sounds or collision sounds. The driving simulator can create various driving environments under controlled conditions and can reproduce vehicle behavior (hereinafter, also referred to as a "motion") in the driving simulator such as rolling, pitching, yawing, and steering reaction force at the time of acceleration and deceleration, cornering, and braking. Accordingly, the driving simulator has been used for development of a vehicle system, study on interaction among a driver, a vehicle, a road, and traffic, and the like.

In addition to the driving simulator, equipment provided with a pair of front and rear bases movable to the front, rear, right, and left sides may be disposed as a vehicle test apparatus. A vehicle may be installed in the vehicle test apparatus and the vehicle may be tested, or a test piece-mounting vehicle frame may be installed in the vehicle test apparatus, mechanical elements or mechanical components (hereinafter, referred to as "test pieces") such as a suspension system, a steering system, and a braking system of a vehicle may be installed thereon, and the test pieces may be tested (see Published Japanese Translation of PCT Application No. 2009-536736 (JP-A-2009-536736)).

When test pieces are installed in the vehicle test apparatus, virtual component parts which are installed in a computer and which are included in a model (hereinafter, referred to as a "vehicle model") simulated by software are used as vehicle components other than the test pieces. A test piece is installed in a test piece-mounting vehicle frame, data obtained by measuring a motion of the test piece is input into a vehicle model, and a posture parameter, a steering reaction force, and the like acquired from the vehicle model are output.

The driving simulator and the vehicle test apparatus may be connected to each other via a communication line and may exchange data with each other in real time. In this case, when input data on a steering wheel, an accelerator pedal, a brake pedal, a shift lever, and the like necessary for driving is transmitted from the driving simulator to the vehicle test apparatus, the vehicle test apparatus applies the input data to the test pieces and the vehicle model and outputs a posture parameter, a steering reaction force, and the like acquired from the test pieces and the vehicle model. The driving simulator reproduces the posture parameter, the steering reaction force, and the like output from the vehicle model.

However, when the driving simulator and the vehicle test apparatus are simultaneously operated on the basis of the data acquired via the communication line and a communication cycle (which is determined by a process time of each terminal, a transmission cycle for a packet, and the like) is long, a delay corresponding to the communication cycle occurs until the driving simulator transmits operation data, the vehicle test apparatus calculates and transmits output data corresponding to the operation data, and the driving simulator receives the output data and feeds back the output data to a driver. Accordingly, the driving simulator cannot update data during the delay and thus the driving simulator may not correctly determine performance of the test piece. Particularly, when the value of the transmitted data rapidly varies, reproduction of the state may not follow the variation appropriately and the test operation may be unstable, thereby causing resonance. Thus, when a communication delay of a predetermined time or more is present, it is difficult to perform real-time simulation and the entire vehicle test system is adversely affected.

SUMMARY OF THE INVENTION

The present invention provides a test system in which a simulated machine can simulate a state of an actual machine as accurately as possible even when a time corresponding to one communication cycle is required until the actual machine transmits the next data after transmitting data and the simulated machine cannot update the data during the time. The present invention provides a motion control method for a driving simulator, and a vehicle test system, which make it possible for the driving simulator to simulate a state of a test piece as accurately as possible even in a state where a considerable time is required for communication between the driving simulator and a vehicle test apparatus, and the driving simulator cannot update data during the time.

A first aspect of the invention relates to a test system including an actual machine including a test piece that is a mechanical element of a vehicle, the actual machine being installed in a first location; a control device that is installed in the first location, and controls the actual machine; a model installed in a second location away from the first location; a data processor that is installed in the second location, and is connected to the actual machine or the control device via a communication line so that data communication is performed, the data processor acquiring data from the actual machine via the communication line so that an operation test is performed. In the test system, the data processor calculates a target value for controlling the actual machine based on an output acquired by inputting the acquired data to the model, and the control device controls the actual machine based on the target value.

In the above-mentioned aspect, a first actual machine (A1) that is the actual machine and a first simulated machine (B1) that simulates an operation of a second actual machine (A2) that is another mechanical element coupled to the first actual machine (A1) may be installed in the first location; the second actual machine (A2) and a second simulated machine (B2) that simulates an operation of the first actual machine (A1) may be installed in the second location; the second actual machine (A2) and the second simulated machine (B2) may be mechanically coupled to each other, and the first simulated machine (B1) and the first actual machine (A1) may be mechanically coupled to each other; the first simulated machine (B1), the second actual machine (A2), the second simulated machine (B2), and the first actual machine (A1) may be connected to a network so that data communication is performed and the operation test is performed.

In the above-mentioned aspect, the test system may include a first data processor (11) that is connected to the first simulated machine (B1) and acquires data from the second actual machine (A2) via the network in each communication cycle, and a second data processor (21) that is the data processor, and that is connected to the second simulated machine (B2) and acquires data from the first actual machine (A1) via the network in each communication cycle; and the first data processor (11) may calculate an estimated value used for performing interpolation on the data acquired in each communication cycle, and the second data processor (21) may calculate an estimated value used for performing interpolation on the data acquired in each communication cycle.

Here, reference signs such as (A) and (B) are reference signs used in the accompanying drawings and the invention is not limited to the reference signs (the same is true of the appended claims). In the test system according to the above-mentioned aspect of the invention, the first data processor (11) may calculate a control target value for the first simulated machine (B1) using the data on the second actual machine (A2) on which the interpolation has been performed using the estimated value, and may control the first simulated machine (B1) using the calculated control target value. The second data processor (21) may calculate a control target value for the second simulated machine (B2) using the data on the first actual machine (A1) on which the interpolation has been performed using the estimated value and may control the second simulated machine (B2) using the calculated control target value. Therefore, the control target value for the first simulated machine (B1) can follow the measurement data on the second actual machine (A2) more appropriately (in other words, it is possible to improve the followability of the control target value for the first simulated machine (B1) with respect to the measurement data on the second actual machine (A2)). That is, according to the above-mentioned aspect of the invention, it is possible to improve real-machine reproduction accuracy of the first simulated machine (B1). Similarly, it is possible to improve real-machine reproduction accuracy of the second simulated machine (B2).

However, in an abnormal state where the estimated value is different from the data acquired from the second actual machine (A2) by a threshold value or greater, if the first data processor (11) calculates the control target value using the estimated value, a control error increases, and thus the control target value may be calculated using only the data acquired from the second actual machine (A2). In this case, the calculated control target value may be transmitted to the second data processor (21), and the second data processor (21) may control the second simulated machine (B2) using the received control target value.

By providing such a countermeasure against the abnormal state, it is possible to promptly cope with a case where the data acquired from the second actual machine (A2) is different from the estimated value by a threshold value or greater and to continue to perform control based on the data acquired from the second actual machine (A2). When the first data processor (11) finds the abnormal state, the first data processor (11) may transmit a flag indicating the abnormal state together with the calculated control target value to the second data processor (21). In this case, the second data processor (21) can enter into the control of the second simulated machine (B2) using reception of the flag as a trigger.

The above countermeasure is a countermeasure against the abnormal state where the estimated value in the first data processor (11) is different from the data acquired from the second actual machine (A2) by a threshold value or greater. However, the above countermeasure may be similarly applied to an abnormal state where the estimated value in the second data processor (21) is different from the data acquired from the first actual machine (A1) by a threshold value or greater.

In the above-mentioned aspect, the test system may be a vehicle test system; the vehicle test system may include a driving simulator, and a vehicle test apparatus which is connected with the driving simulator via the communication line, and in which a test piece is mounted, the test piece being a mechanical element of the vehicle; the driving simulator may include a transmitter unit that transmits a vehicle operation signal to the vehicle test apparatus; the vehicle test apparatus may include a receiver unit that receives the vehicle operation signal, a vehicle behavior calculating unit that is the processor, and that operates the test piece based on a content of the received vehicle operation signal so as to input measurement data, which is obtained by measuring a motion of the test piece, to a vehicle model that is the model, and to acquire output data, and a vehicle behavior database that stores vehicle behavior data including operation data indicating the content of the vehicle operation signal and the output data corresponding to the operation data; the vehicle test apparatus may transmit the vehicle behavior data stored in the vehicle behavior database to the driving simulator; and the driving simulator may be operated using the transmitted vehicle behavior data in response to a driver's vehicle operation.

A second aspect of the invention relates to a motion control method for a driving simulator. The motion control method includes connecting the driving simulator to a vehicle test apparatus in which a test piece is mounted, via a communication line, the test piece being a mechanical element of a vehicle; transmitting a vehicle operation signal, by the driving simulator, to the vehicle test apparatus; operating the test piece, by the vehicle test apparatus, based on a content of the vehicle operation signal so as to input measurement data, which is obtained by measuring a motion of the test piece, to a vehicle model, and to acquire output data; creating, by the vehicle test apparatus, a vehicle behavior database that stores vehicle behavior data including operation data indicating the content of the vehicle operation signal and the output data corresponding to the operation data; transmitting, by the vehicle test apparatus, the vehicle behavior data stored in the vehicle behavior database to the driving simulator; and operating the driving simulator using the transmitted vehicle behavior data in response to a driver's vehicle operation.

According to this motion control method, instead of feeding back and using the vehicle behavior data acquired in real time during operation of the driving simulator, the vehicle behavior data in the vehicle behavior database is transmitted to the driving simulator and the driving simulator is operated using the transmitted vehicle behavior data in response to a driver's vehicle operation.

The vehicle behavior database may be created by performing a preliminary behavior estimating test so as to estimate a vehicle behavior in a steering input pattern. Accordingly, the vehicle behavior data in the previously-created vehicle behavior database can be transmitted to the driving simulator and the driving simulator can use the vehicle behavior data. The vehicle test system according to the invention is a system for performing the motion control method for the driving simulator according to the invention.

According to the above-mentioned aspect of the invention, even when a considerable delay occurs in data communication between the driving simulator and the vehicle test apparatus, followability of data can be improved, and the driving simulator can accurately simulate the state of the test piece that is the mechanical element of the vehicle, with a minimum time delay.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first embodiment of the invention will be described with reference to the accompanying drawings.

Figure 1:
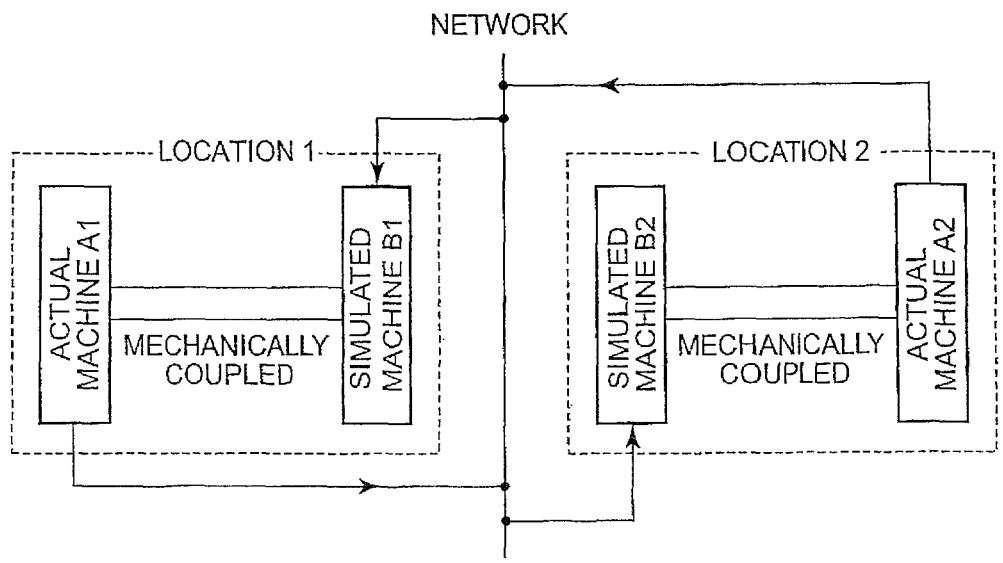
FIG. 1 is a diagram schematically illustrating a test system according to related art in which an actual machine A1 and a simulated machine B1 are installed in location 1, a simulated machine B2 and an actual machine A2 are installed in another place (location 2), the actual machine A2 and the simulated machine B2 are mechanically coupled to each other, and the simulated machine B1 and the actual machine A1 are mechanically coupled to each other.
Figure 2:
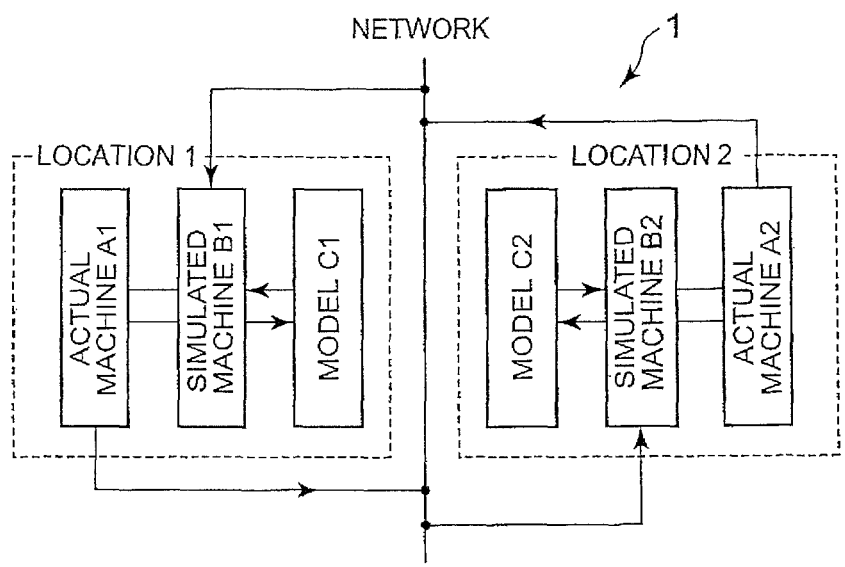
FIG. 2 is a diagram schematically illustrating a test system 1 according to the invention in which an actual machine A1 and a simulated machine B1 are installed in location 1, a simulated machine B2 and an actual machine A2 are installed in another place (location 2), the actual machine A2 and the simulated machine B2 are mechanically coupled to each other, and the simulated machine B1 and the actual machine A1 are mechanically coupled to each other.

FIG. 2 is a diagram schematically illustrating a test system 1 according to the invention in which an actual machine A1 and a simulated machine B1 are installed in location 1, a simulated machine B2 and an actual machine A2 are installed in another place (location 2), the actual machine A2 and the simulated machine B2 are mechanically coupled to each other, and the simulated machine B1 and the actual machine A1 are mechanically coupled to each other. In the embodiment of the invention, for example, it is assumed that the actual machine A2 is an electronic-control coupling mechanism which can continuously vary a ratio between driving forces of front and rear wheels from front wheels 100: rear wheels 0 in a front wheel drive to front wheels 50: rear wheels 50 by electronic control in a front wheel drive-based 4WD vehicle, and the actual machine A1 is a prime mover coupled to the coupling mechanism.

The simulated machine B2 is a motor simulating the prime mover, and the simulated machine B1 is a motor simulating the electronic-control coupling mechanism. The simulated machine B1 and the actual machine A1 are mechanically coupled to each other by a shaft, and the simulated machine B2 and the actual machine A2 are mechanically coupled to each other by a shaft. The mechanical elements in the invention are not limited to such specific examples, and arbitrary mechanical elements of a vehicle coupled to each other may be selected as the actual machine A2 and the actual machine A1.

The simulated machine B1 and the actual machine A2 are connected to each other via a network, and one or both of a rotation speed and a rotation torque of the shaft is/are transmitted as measurement data. The simulated machine B2 and the actual machine A1 are connected to each other via a network, and one or both of the rotation speed and the rotation torque (hereinafter, referred to as a "torque or rotation speed") of the shaft is/are transmitted as measurement data via the network. A model C1 and a model C2 that estimate operations of the actual machine A2 and the actual machine A1, respectively, and that provide data on the estimated values are installed. The model C1 is connected to the simulated machine B1 and the simulated machine B1 receives data on the estimated value of the model C1. The model C2 is connected to the simulated machine B2 and the simulated machine B2 receives data on the estimated value of the model C2.

Figure 3A:
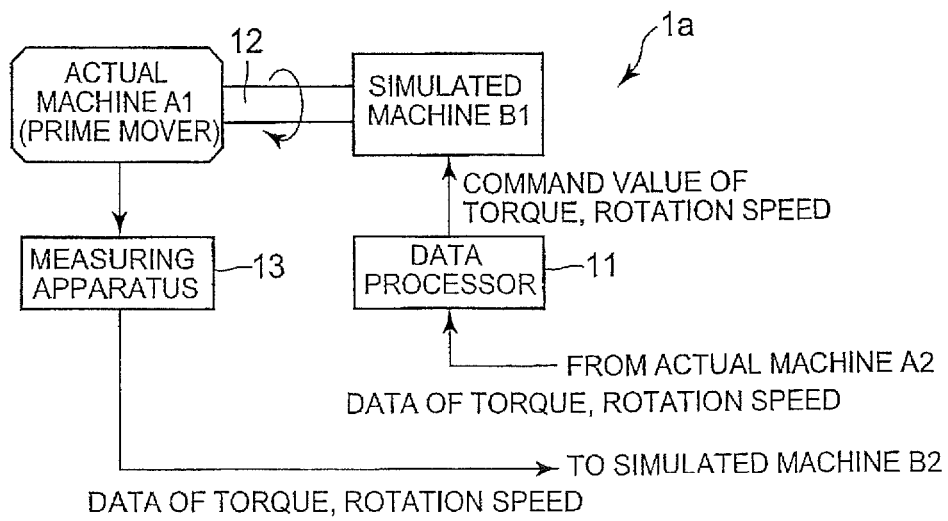
FIGS. 3A and 3B are diagrams illustrating a configuration of a test system 1a according to related art.

A specific configuration of the test system 1 will be described below. First, the configuration of a test system 1a according to related art will be described with reference to FIGS. 3A and 3B. FIG. 3A is a block diagram illustrating an actual machine A1 and a simulated machine B1 installed in location 1, a data processor 11 that receives data on a torque or rotation speed from an actual machine A2 and that provides the simulated machine B1 with a control target value of a torque or a control target value of a rotation speed, a propeller shaft 12 that couples the actual machine A1 and the simulated machine B1 to each other, and a measuring apparatus 13 that measures a torque or rotation speed of the propeller shaft 12. The actual machine A1 is the prime mover as described above and the simulated machine B1 is the motor.

Figure 3B:
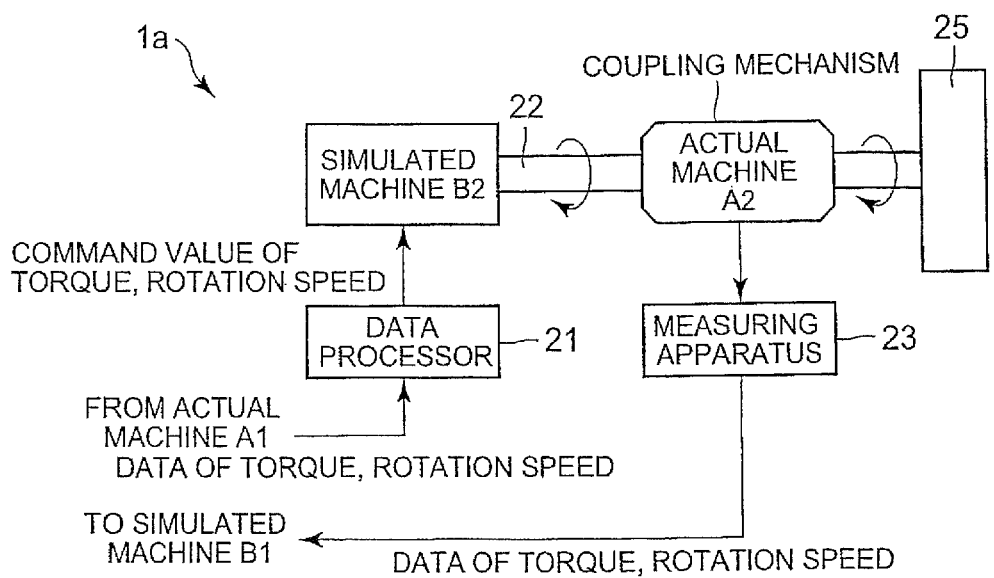

FIG. 3B is a block diagram illustrating a simulated machine B2 and an actual machine A2 installed in location 2, a data processor 21 that receives data on a torque or rotation speed from the actual machine A1 via a network and that provides the simulated machine B2 with a control target value of a torque or a control target value of a rotation speed, a propeller shaft 22 that couples the simulated machine B2 and the actual machine A2 to each other, and a measuring apparatus 23 that measures a torque or rotation speed of the propeller shaft 22. The actual machine A2 is the electronic-control coupling mechanism as described above and the simulated machine B2 is the motor. A flywheel 25 simulating a rear wheel tire is coupled to the actual machine A2.

Figure 4:
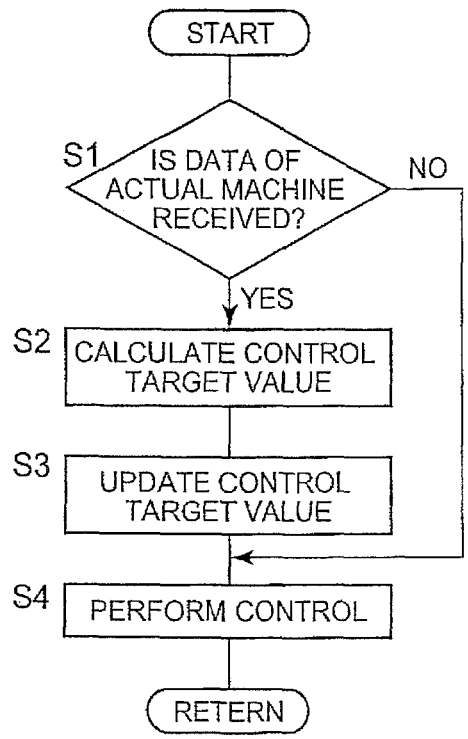
FIG. 4 is a flowchart illustrating a test procedure which is performed by a data processor 11 connected to a simulated machine B1 according to the related art.

In this configuration, a test procedure which is performed by the data processor 11 connected to the simulated machine B1 according to the related art will be described with reference to FIG. 4 illustrating a flowchart. When receiving data on a torque or rotation speed from the actual machine A2 via the network in each communication cycle (the communication cycle is not limited, and is set to, for example, 10 msec) (step S1), the data processor 11 calculates the control target value of the torque or rotation speed on the basis of the received data (step S2). The data processor 11 updates the control target value previously calculated and stored in a memory of the data processor 11 using the calculated control target value (step S3). The data processor 11 performs motor driving control on the simulated machine B1 using the updated control target value (step S4). The acquired control target value is recorded on the memory.

Figure 5:
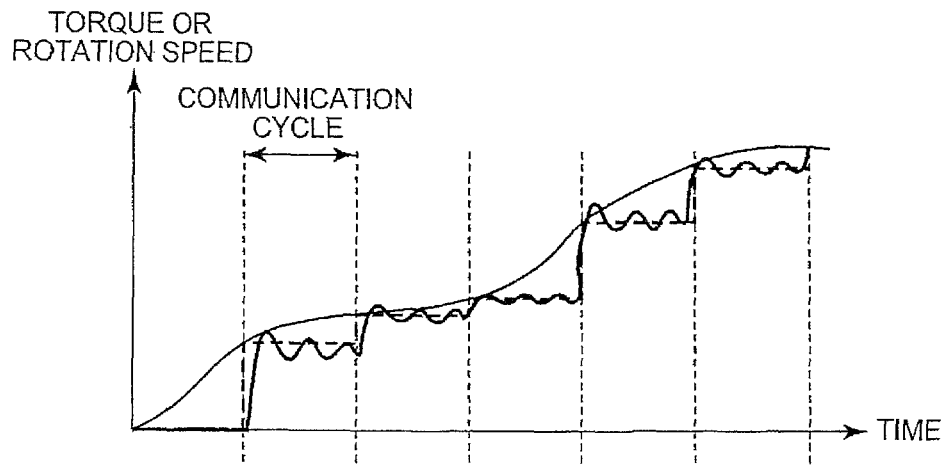
FIG. 5 is a graph illustrating a temporal variation of measurement data on a torque or a rotation speed acquired from an actual machine A2; a control target value for the simulated machine B1, and measurement data on a torque or a rotation speed measured by a measuring apparatus 13.

The test procedure which is performed by the data processor 21 connected to the simulated machine B2 is similarly performed. FIG. 5 is a graph illustrating a temporal variation of measurement data on a torque or rotation speed acquired from the actual machine A2, the control target value for the simulated machine B1, and measurement data on a torque or rotation speed measured by a measuring apparatus 13. The measurement data on the actual machine A2 is indicated by a thin solid line, the control target value is indicated by a thick step-like dotted line, and the measurement data measured by the measuring apparatus 13 is indicated by a curved solid line. The communication cycle is indicated by a vertical dotted line.

As can be seen from FIG. 5, the measurement data on the actual machine A2 continuously varies. However, since the communication cycle of the network is present as described above, the timing of receiving the measurement data on the actual machine A2, which is used by the data processor 11 as a basis for calculating the control target value for the simulated machine B1, is confined to the communication cycle. Accordingly, when the measurement data on the actual machine A2 finely varies, the variation is not followed appropriately and the control target value for the simulated machine B1 varies in a step-like shape. That is, until the next communication cycle, the measurement data on the torque or the rotation speed of the actual machine A2 is fixed and the control target value calculated on the basis of the measurement data at the time of the start of the current communication cycle is held as the calculated value. Depending on details of the control performed on the simulated machine B1 by the data processor 11, the overshoot of the measurement data measured by the measuring apparatus 13 is observed at the timing at which the step rises.

Figure 6:
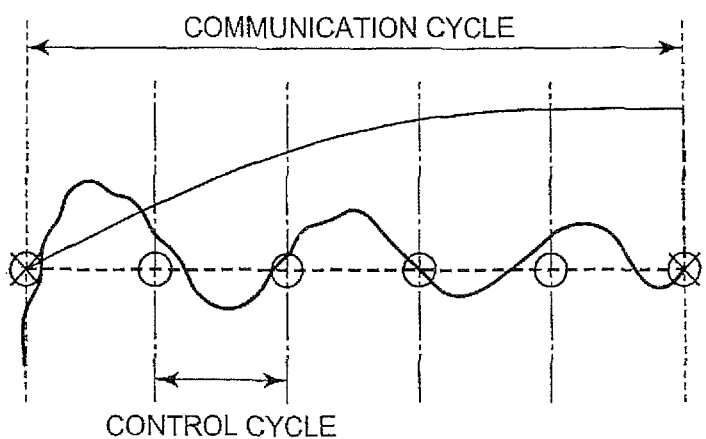
FIG. 6 is an enlarged view of one communication cycle extracted from FIG. 5.

FIG. 6 is an enlarged view of one communication cycle extracted from FIG. 5. Both ends (cross marks) of one communication cycle represent the time point at which the measurement data on the actual machine A2 is received, and each control cycle of the data processor 11 in the communication cycle is indicated by a circle mark. The control target value for the simulated machine B1 does not vary in the communication cycle, corresponds to the flat part of a step, and is fixed to a constant value even when the measurement data on the actual machine A2 varies. Therefore, the real-machine reproduction accuracy of the simulated machine B1 cannot be said to be good. When the overshoot increases, the measurement data may be out of control in the end and may diverge. It is preferable to shorten the communication cycle, but the communication speed allowed for the network is limited.

Figure 7A:
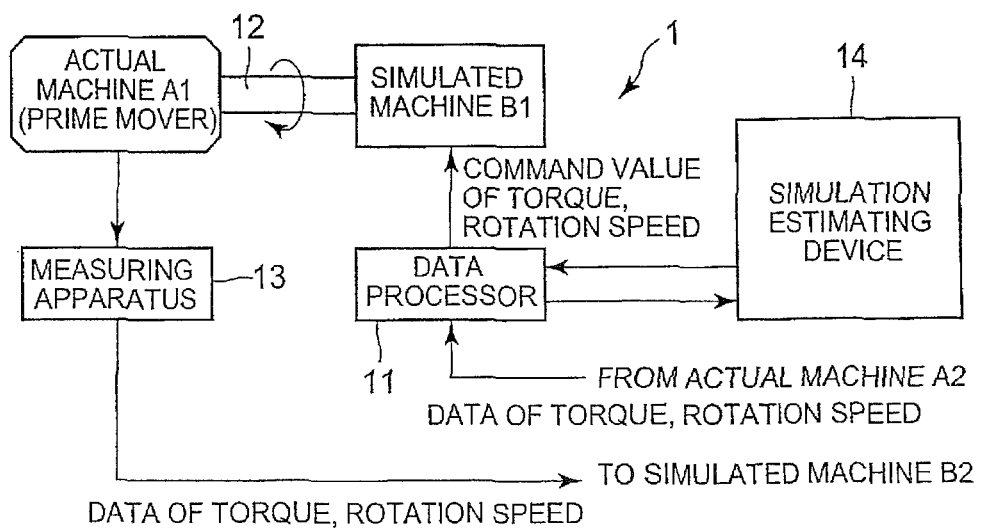
FIGS. 7A and 7B are diagrams illustrating a configuration of a test system 1 according to a first embodiment of the invention.
Figure 7B:
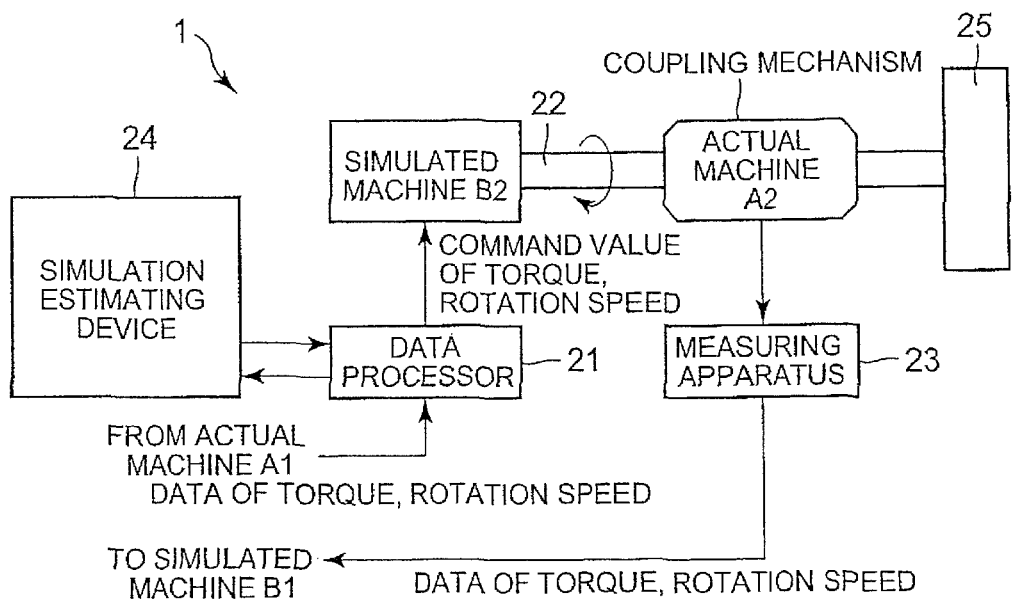

Therefore, in the invention, a configuration of a test system 1 in which a simulation estimating device 14 is added to the data processor 11 and a simulation estimating device 24 is added to the data processor 21 is employed as illustrated in FIGS. 7A and 7B. FIG. 7A illustrates the configuration in location 1, and FIG. 7B illustrates the configuration in location 2. The configuration other than the simulation estimating devices 14 and 24 is the same as that illustrated in FIGS. 3A and 3B. The simulation estimating device 14 estimates a variation of measurement data in each control cycle until the data processor 11 receives the next measurement data after receiving the measurement data on the actual machine A2 in each communication cycle. Then, the data processor 11 calculates the control target value on the basis of the measurement data on the actual machine A2 received in each communication cycle and data on a model state quantity (a model state value) (hereinafter, referred to as an "estimated value") estimated in each control cycle. The simulation estimating device 24 similarly estimates a variation of measurement data until the data processor 21 receives the next measurement data after receiving the measurement data on the actual machine A1, and calculates the control target value on the basis of the received measurement data and the estimated value in each control cycle.

Figure 8:
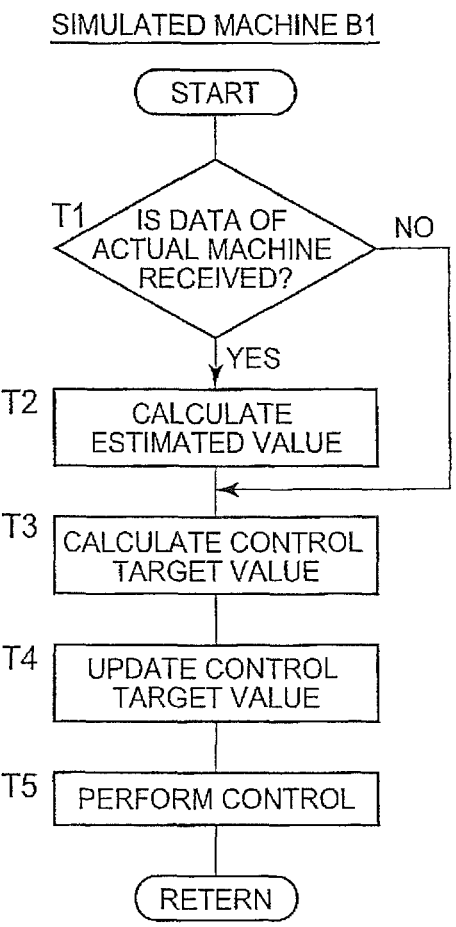
FIG. 8 is a flowchart illustrating a test procedure according to the invention which is performed by a data processor 11 connected to a simulated machine B1.

FIG. 8 is a flowchart illustrating a test procedure according to the invention which is performed by the data processor 11 connected to the simulated machine B1. When the data processor 11 receives data on a torque or rotation speed from the actual machine A2 via a network in each communication cycle (step T1), the simulation estimating device 14 calculates the estimated value of the torque or rotation speed in each control cycle (it is assumed that the control cycle is shorter than the communication cycle and, for example, the communication cycle is 10 msec and the control cycle is 2 msec), on the basis of the received data (step T2), and transmits the calculated estimated value to the data processor 11. The data processor 11 calculates the control target value for the simulated machine B1 using the calculated estimated value (step T3). The control target value previously calculated and stored in the memory in the data processor 11 is updated in each control cycle, by using the control target value (step T4). The simulated machine B1 is controlled using the updated control target value (step T5).

The test procedure, which is performed by the data processor 21 connected to the simulated machine B2 and the simulation estimating device 24, is performed in the same way. Thus, the variation of the torque or rotation speed of the actual machine is estimated using the simulation estimating device, and the control target value for the simulated machine is calculated using the estimated data in each control cycle, instead of using the data on the torque or rotation speed, which is received from the actual machine via the network in each communication cycle, without changing the data in the corresponding communication cycle.

Figure 9:
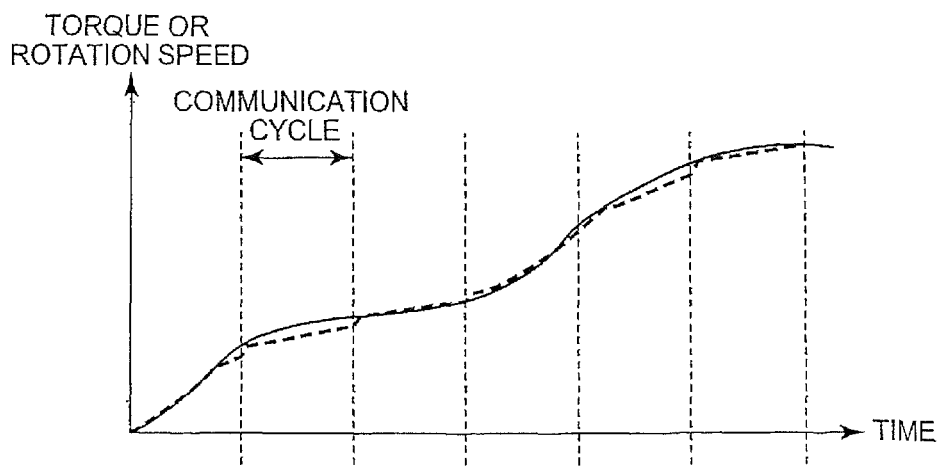
FIG. 9 is a graph illustrating data on a torque or a rotation speed measured in an actual machine and an estimated value calculated by a simulation estimating device.
Figure 10:
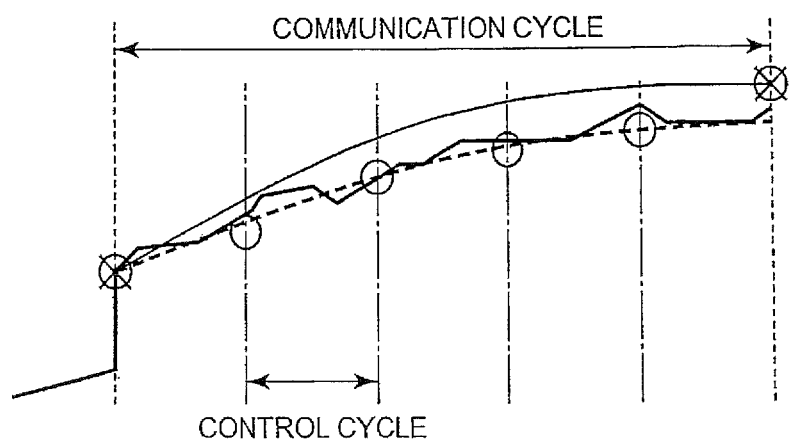
FIG. 10 is an enlarged view of one communication cycle extracted from FIG. 9.

FIG. 9 is a graph illustrating the data on the torque or rotation speed measured in the actual machine and the estimated value of the simulation estimating device. The measurement data on the actual machine is indicated by a thin solid line, and the estimated value is indicated by a thick dotted line having a polygonal curve shape. The communication cycles are indicated by vertical dotted lines. FIG. 10 is an enlarged view of one communication cycle extracted from FIG. 9. Both ends (cross marks) of one communication cycle represent time points at which the measurement data on the actual machine is received, and each control cycle of the data processor in the communication cycle is indicated by a circle mark. Thus, since the control target value is calculated on the basis of the estimated value, the control target value appropriately follows the measurement data on the actual machine (in other words, the followability of the control target value with respect to the measurement data on the actual machine is appropriate). As a result, the amount of rising of a step as illustrated in FIG. 5 decreases, and the overshoot also decreases accordingly. It is possible to improve the real-machine reproduction accuracy of the simulated machine.

Details of the simulation estimating process which is performed by the simulation estimating device are not limited. For example, the configuration may be such that, on the basis of the measurement data on the actual machine received in an immediately-previous communication cycle and the respective measurement data on the actual machine received before N (N is an integer equal to or greater than 1) communication cycle(s), straight lines close to the respective measurement data are approximately calculated, slopes of the straight lines are calculated, and the straight lines having the corresponding slopes are connected to the measurement data received in the immediately-previous communication cycle, and thus, values in the respective control cycles are calculated, and the calculated values are set as the estimated values in the respective control cycles.

Figure 11:
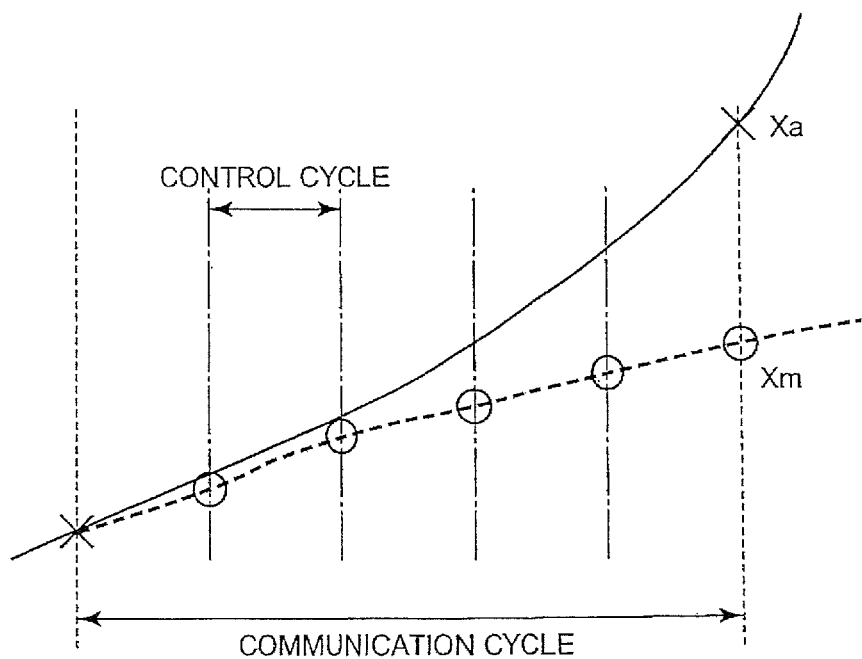
FIG. 11 is an enlarged view illustrating a state where an estimated value is different from measurement data on an actual machine when the measurement data on the actual machine peculiarly varies.

Abnormal operation correcting control according to a modified example of the invention will be described. In the above-mentioned test procedure according to the invention, the simulation estimating device estimates the measurement data on the actual machine by performing a simulation estimating process. For example, when the measurement data on the actual machine peculiarly varies, it is considered that the estimated value may be different from the measurement data on the actual machine. For example, FIG. 11 is an enlarged view illustrating this case where measurement data Xa on the actual machine greatly varies in adjacent communication cycles (cross marks) and is greatly different from the estimated value Xm calculated in each control cycle (circle marks). In this case, when the control target value is calculated on the basis of the estimated value, the control target value calculated on the basis of the estimated value used hitherto and the control target value calculated on the basis of the measurement data on the actual machine are greatly different from each other at the time point at which the measurement data on the actual machine is received in the next communication cycle.

Figure 12:
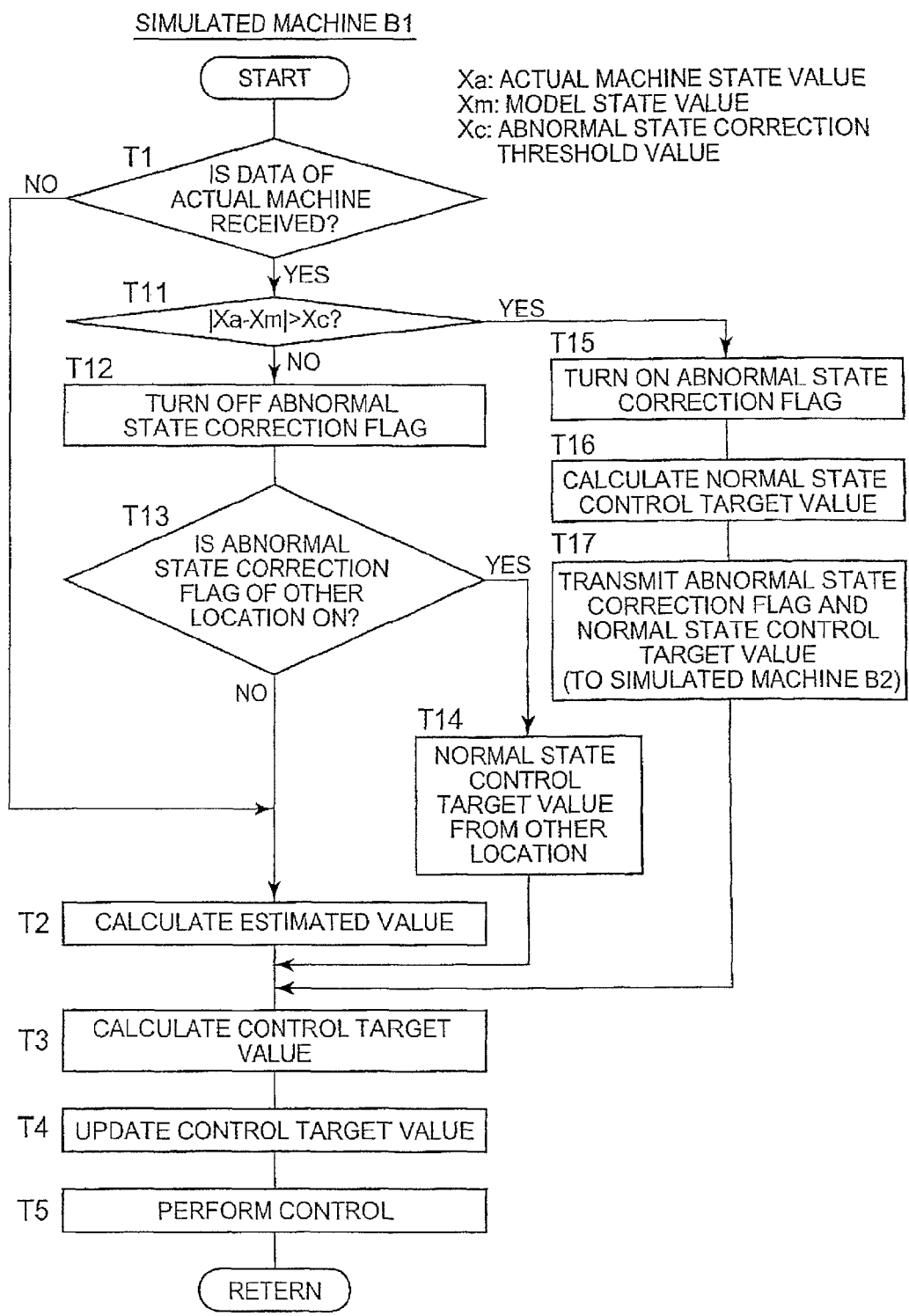
FIG. 12 is a flowchart illustrating a test procedure according to the invention of calculating a control target value on the basis of measurement data on an actual machine instead of an estimated value used hitherto at a time point at which the measurement data on the actual machine is acquired in the next communication cycle when the measurement data on the actual machine in one location is different from the estimated value estimated by simulation.

Therefore, as illustrated in the flowchart of FIG. 12, for example, when the data processor 11 for the simulated machine B1 receives data Xa that is the measurement data on the actual machine A2 via the network in each communication cycle (step T1), the data processor 11 compares the received data Xa with the estimated value Xm and determines whether the absolute value of the difference therebetween is greater than an abnormal state correction threshold value Xc (step T11). When it is determined that the absolute value of the difference is equal to or smaller than the abnormal state correction threshold value Xc, an abnormal state correction flag is turned off (step T12). Then, the data processor 11 determines whether an abnormal state correction flag of another location transmitted from the other location is on (step T13). When the abnormal state correction flag is off, the data processor 11 calculates the estimated value as illustrated in steps T2 to T5 in FIG. 8 (step T2), calculates the control target value for the simulated machine B1 using the calculated estimated value (step T3), updates the control target value previously calculated and stored in the memory of the data processor 11 in each control cycle (step T4), and controls the simulated machine B1 using the updated control target value (step T5).

When it is determined in step T13 that the abnormal state correction flag of the other location is on, the data processor sets a normal-state control target value transmitted from the other location as the control target value for the simulated machine B1 without using the estimated value (step T14), and controls the simulated machine B1 using the control target value (steps T3 to T5). In this way, the normal-state control target value for the simulated machine B2 processed in the other location and transmitted from the other location is employed. In order to reduce a communication load, the normal-state control target value is transmitted, instead of transmitting the measurement data, such as the torque or the rotation speed of the actual machine A2 measured in the other location.

When it is determined in step T11 that the absolute value of the difference between the data Xa and the estimated value Xm is greater than the abnormal state correction threshold value Xc, the abnormal state correction flag is turned on in step T15 (step T15). Then, the control target value is calculated on the basis of the measurement data Xa on the actual machine A2 instead of the estimated value Xm (step T16). This control target value is referred to as the "normal-state control target value" with a meaning of a control target value corrected and calculated to correct and return the state to a normal state.

The data processor 11 transmits the normal-state control target value to the data processor 21 in the other location (step T17), in order to set the flag so that both simulated machines are regarded as being in an abnormal state when either one of the simulated machines is deviated. The data processor 21 sets the normal-state control target value as the control target value for the simulated machine B2 without using the estimated value and controls the simulated machine B2 using the control target value (steps T3 to T5).

By employing this process flow, when the measurement data on the actual machine is different from the estimated value estimated by simulation in one of locations, the control target value is calculated on the basis of the measurement data on the actual machine instead of the estimated value used hitherto, at the time point at which the measurement data on the actual machine is received in the next communication cycle. Accordingly, it is possible to prevent the control target value for the simulated machine and the measurement data on the actual machine from being greatly different from each other by correction in the one location. As a result, it is possible to prevent an increase in overshoot and divergence of control.

By notifying the data processor in the other location that the measurement data on the actual machine is different from the estimated value estimated by simulation in the one location, it is possible to prevent the control target value for the simulated machine B2 and the measurement data on the actual machine A1 from being greatly different from each other by correction in the other location. The invention is not limited to the above-mentioned embodiment, and various modifications may be made to the embodiment without changing the scope of the invention. For example, the actual machine A2 may be a steering system and the actual machine A1 may be a tire system. In this case, the simulated machine B1 is a motor for rotationally driving a tire and the simulated machine B2 is a motor for applying a reaction force of the tire to the rotation of a steering shaft. The actual machine A2 may be a wheel-in motor of a vehicle and the actual machine A1 may be a tire system.

Figure 13:
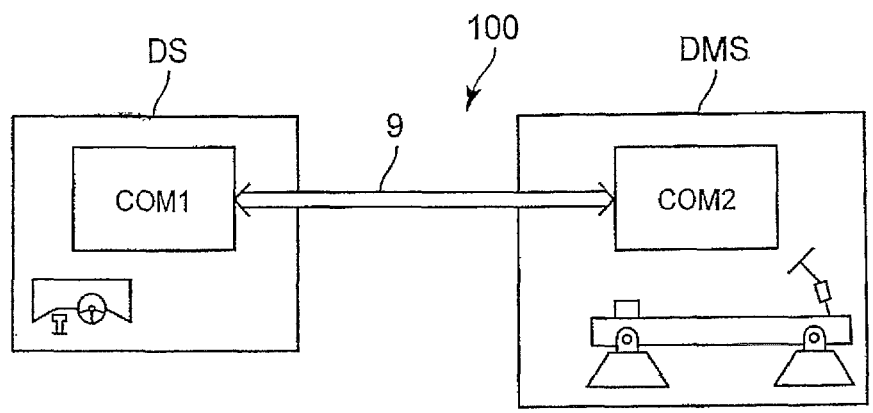
FIG. 13 is a diagram schematically illustrating a vehicle test system 100 according to a second embodiment of the invention in which a driving simulator DS is installed in a certain place (location 1), a vehicle test apparatus DMS is installed in another place (location 2), and the vehicle test apparatus DMS and the driving simulator DS are connected to each other via a communication line 9.

Hereinafter, a second embodiment of the invention will be described with reference to the accompanying drawings. FIG. 13 is a diagram schematically illustrating a vehicle test system 100 according to the second embodiment of the invention in which a driving simulator DS is installed in a certain place (location 1), a vehicle test apparatus DMS is installed in another place (location 2), and the vehicle test apparatus DMS and the driving simulator DS are connected to each other via a communication line 9 such as an optical cable, a coaxial cable, and the like. In FIG. 13, COM1 represents a computer of the driving simulator DS and COM2 represents a computer of the vehicle test apparatus DMS.

Figure 14:
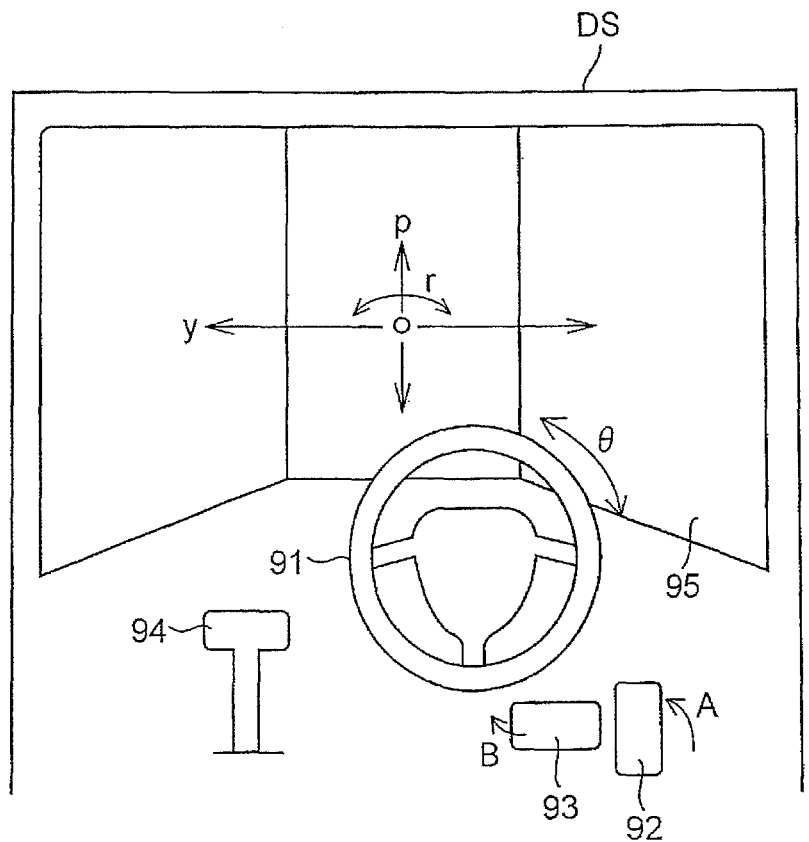
FIG. 14 is a diagram schematically illustrating an operation unit of the driving simulator DS.

In the embodiment of the invention, in the driving simulator DS, input devices such as a steering wheel 91, an accelerator pedal 92, a brake pedal 93, and a shift lever 94 are mounted, and a monitor 95 that displays a landscape appearing through a vehicle window is also mounted, as illustrated in FIG. 14. The steering wheel 91 is connected to a reaction force motor (not illustrated) for simulatively applying a reaction force which a driver receives from a road surface. Actuators (not illustrated) for applying various motions of rolling, pitching, and yawing are provided for a driver's seat.

Data pieces such as a steering angle θ of the steering wheel 91, a depression amount A of the accelerator pedal 92, and a depression force B of the brake pedal 93 are input to the computer COM1 of the driving simulator DS. The driving simulator DS is connected to a reaction force motor driver 63 (see FIG. 16) that simulatively creates reaction force data which the driver receives from the road surface and that drives the reaction force motor (not illustrated) on the basis of the reaction force data, in response to a command from the computer COM1. The computer COM1 of the driving simulator DS is connected to a motion controller 64 (see FIG. 16) that drives actuators to realize motions such as a roll angle r, a pitch angle p, and a yaw angle y (these three parameters are referred to as "posture parameters") at the time of acceleration and deceleration, cornering, and braking. An image driver 67 (see FIG. 16) is also provided which controls driving of the monitor 95 so as to move and rotate a landscape depending on a traveling distance. The landscape displayed on the monitor 95 moves on the basis of an instruction of the image driver 67. The directions in which the landscape moves depending on the roll angle r, the pitch angle p, and the yaw angle y are indicated by arrows on the monitor 95 of FIG. 14.

Figure 15:
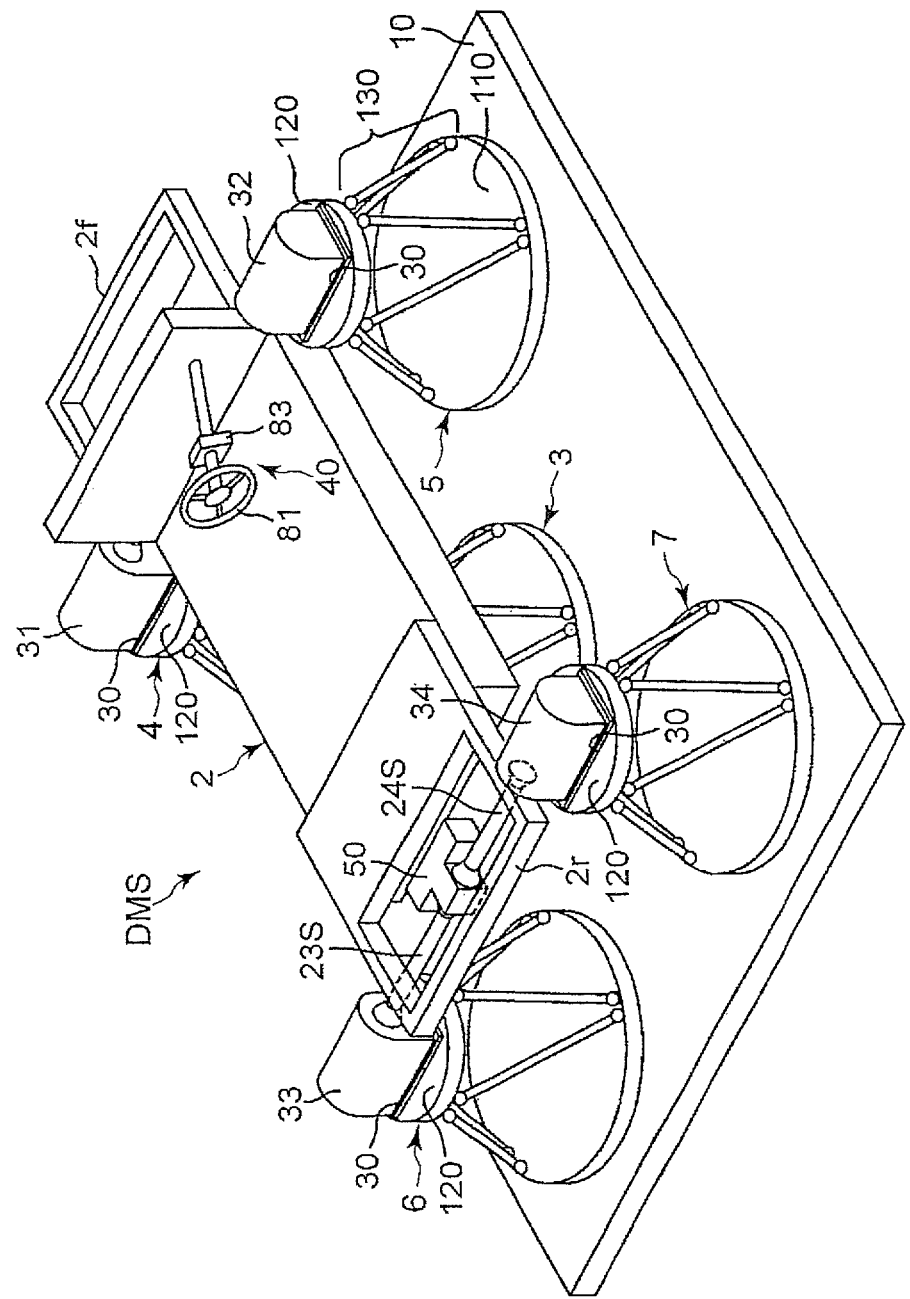
FIG. 15 is a perspective view schematically illustrating an appearance of the vehicle test apparatus DMS.

FIG. 15 is a perspective view schematically illustrating an appearance of the vehicle test apparatus DMS. The vehicle test apparatus DMS includes a test piece-mounting vehicle body 2 on which four axles 21S, 22S, 23S, and 24S (where 21S and 22S are hidden due to other members and thus are not illustrated) corresponding to four vehicle wheels of a front-left wheel, a front-right wheel, a rear-left wheel, and a rear-right wheel are mounted and test pieces are mounted, a first motion base 3 that supports the test piece-mounting vehicle body 2 and that causes the test piece-mounting vehicle body 2 to move with 6 degrees of freedom, and four second motion bases 4, 5, 6, and 7 that support the axles 21S, 22S, 23S, and 24S, respectively, and that causes the axles 21S, 22S, 23S, and 24S to move with 6 degrees of freedom.

In FIG. 15, a front end of the test piece-mounting vehicle body 2 is denoted by reference sign 2f, and a rear end of the test piece-mounting vehicle body 2 is denoted by reference sign 2r. The outer end parts of four axles 21S, 22S, 23S, and 24S of the test piece-mounting vehicle body 2 are connected to output shafts of four electric motors (hereinafter, referred to as "external force applying motors") 31, 32, 33, and 34 that apply a rotational force to the axles. The electric motors 31, 32, 33, and 34 are configured to individually apply the same rotational forces as the rotational forces (external forces), which are applied to the axles from the outside when a real vehicle travels, to the corresponding axles 21S, 22S, 23S, and 24S. Examples of the external forces include rotational loads applied to the axles due to road friction when a real vehicle travels and rotational forces applied to the axles via the road surface when the real vehicle descends down a slope.

Test pieces which are various mechanical elements of a vehicle are mounted on the test piece-mounting vehicle body 2. In this embodiment, an electric power steering (EPS) system 40 and a rear wheel driving module 50 that drives the axle 23S for the rear-left wheel and the axle 24S for the rear-right wheel by the use of an electric motor are mounted as test pieces on the test piece-mounting vehicle body 2. In this embodiment, the EPS 40 is a column assist type EPS. As known well, the EPS 40 includes a steering wheel 81, a turning mechanism (not illustrated) that turns the front wheels by in accordance with the rotation of the steering wheel 81, and a steering assist mechanism 83 that assists a driver's steering. The steering wheel 81 and the turning mechanism 82 are mechanically connected to each other via a steering shaft.

The turning mechanism includes a rack and pinion mechanism having a pinion disposed at the lower end of the steering shaft and a rack shaft provided with a rack fitted to the pinion. The ends of the rack shaft are connected to the front wheels via tie rods, knuckle arms, and the like. The steering assist mechanism 83 includes an electric motor (hereinafter, referred to as an "assist motor") that generates a steering assist force and a speed reduction mechanism that transmits an output torque of the assist motor to the steering shaft.

The EPS 40 further includes an electronic control unit (ECU) (hereinafter, referred to as an "EPS ECU") that controls the assist motor and a linear displacement sensor that detects a displacement in the axial direction of the rack shaft. The rear wheel driving module 50 includes an electric motor (hereinafter, referred to as a "rear wheel driving motor") that rotationally drives the axles 23S and 24S for the rear wheels, a transmission mechanism that transmits the rotational force of the rear wheel driving motor to the axles 23S and 24S for the rear wheels, an ECU (hereinafter, referred to as a "rear wheel driving-motor ECU") that controls the rear wheel driving motor, and a rotation angle sensor that detects the rotation angle(s) of one or both of the axles 23S and 24S for the rear wheels. The transmission mechanism includes a clutch and a reduction mechanism. The transmission mechanism may include one of the clutch and the reduction mechanism.

The motion bases 3, 4, 5, 6, and 7 are fixed to a plate 10 placed on the floor. As known well, each of the motion bases 3, 4, 5, 6, and 7 includes a fixed base 110 fixed to the plate 10, a moving base 120 disposed above the fixed base 110, a piston-like actuator 130 that is connected between the fixed base 110 and the moving base 120 and that causes the moving base 120 to move with 6 degrees of freedom (in forward, rearward, rightward, leftward, upward, downward, roll, pitch, and yaw directions), and a motion controller (not illustrated) that controls the driving of the actuator 130. The actuator 130 includes six electric cylinders. The motion controller includes a driver circuit that applies a drive current to a drive motor provided in the actuator 130 in response to an input of a signal corresponding to each of the motions of the 6 degrees of freedom.

The test piece-mounting vehicle body 2 is fixed to the moving base of the first motion base 3 in a state where the central part of the test piece-mounting vehicle body 2 is mounted thereon. That is, the central part of the bottom surface of the test piece-mounting vehicle body 2 is attached to the top surface of the moving base of the first motion base 3. That is, the test piece-mounting vehicle body 2 is supported by the first motion base 3. The motor bodies of the external force applying motors 31, 32, 33, and 34 are fixed to the moving bases 120 of the second motion bases 4, 5, 6, and 7, respectively, with elastic sheet members 30 interposed therebetween. That is, the motor bodies of the external force applying motors 31, 32, 33 and 34 are supported by the second motion bases 4, 5, 6, and 7, respectively, with the elastic sheet members 30 interposed therebetween. In other words, the axles 21S, 22S, 23S, and 24S are supported by the second motion bases 4, 5, 6, and 7, respectively, with the elastic sheet members 30 and the corresponding external force applying motors 31, 32, 33, and 34 interposed therebetween. Motor controllers 35, 36, 37, and 38 (see FIG. 17) that control the external force applying motors 31, 32, 33, and 34, respectively, are mounted on the test piece-mounting vehicle body 2.

The same rotational forces as the rotational forces (external forces), which are applied to the axles from the outside when a real vehicle travels, can be individually applied to the corresponding axles 21S, 22S, 23S, and 24S by the use of the external force applying motors 31, 32, 33, and 34. Accordingly, it is possible to reproduce driving loads and suspension behavior based on the real driving condition. In the vehicle test apparatus DMS, various vehicle postures can be reproduced by controlling the driving of the actuator 130 for the first motion base 3 and individually controlling the driving of the actuators 130 for the second motion bases 4, 5, 6, and 7. Therefore, by controlling the actuators 130 for the motion bases 3, 4, 5, 6, and 7 as a whole, it is possible to reproduce various vehicle traveling postures including rolling, pitching, and yawing.

Figure 16:
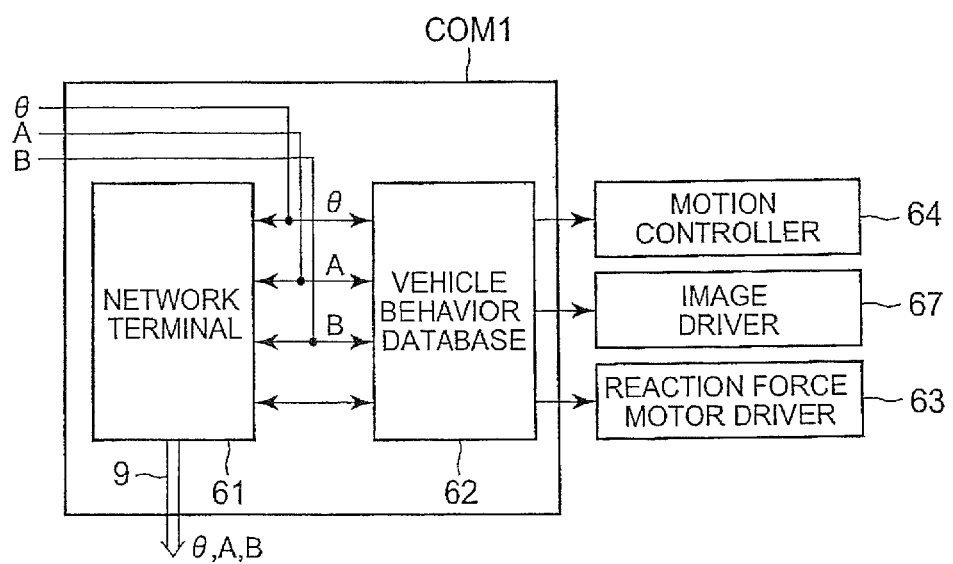
FIG. 16 is a block diagram schematically illustrating an electrical configuration of the driving simulator DS.

FIG. 16 is a block diagram schematically illustrating an electrical configuration of the driving simulator DS. As illustrated in FIG. 16, the data pieces such as the steering angle θ of the steering wheel 91, the depression amount A of the accelerator pedal 92, and the depression force B of the brake pedal 93 are input to a network terminal 61 in the computer COM1 and are transmitted to the vehicle test apparatus DMS therefrom. The data pieces θ, A, and B are also input to a vehicle behavior database 62 installed in the computer COM1.

The vehicle behavior database 62 reads reaction force data corresponding to the steering angle θ input to the vehicle behavior database in response to an instruction of a calculation unit (not illustrated) of the computer COM1 and supplies the read reaction force data to the reaction force motor driver 63. The vehicle behavior database 62 reads the traveling distance, the roll angle r, the pitch angle p, and the yaw angle y based on the data pieces θ, A, and B and supplies the read data pieces to the motion controller 64 and the image driver 67.

Figure 17:
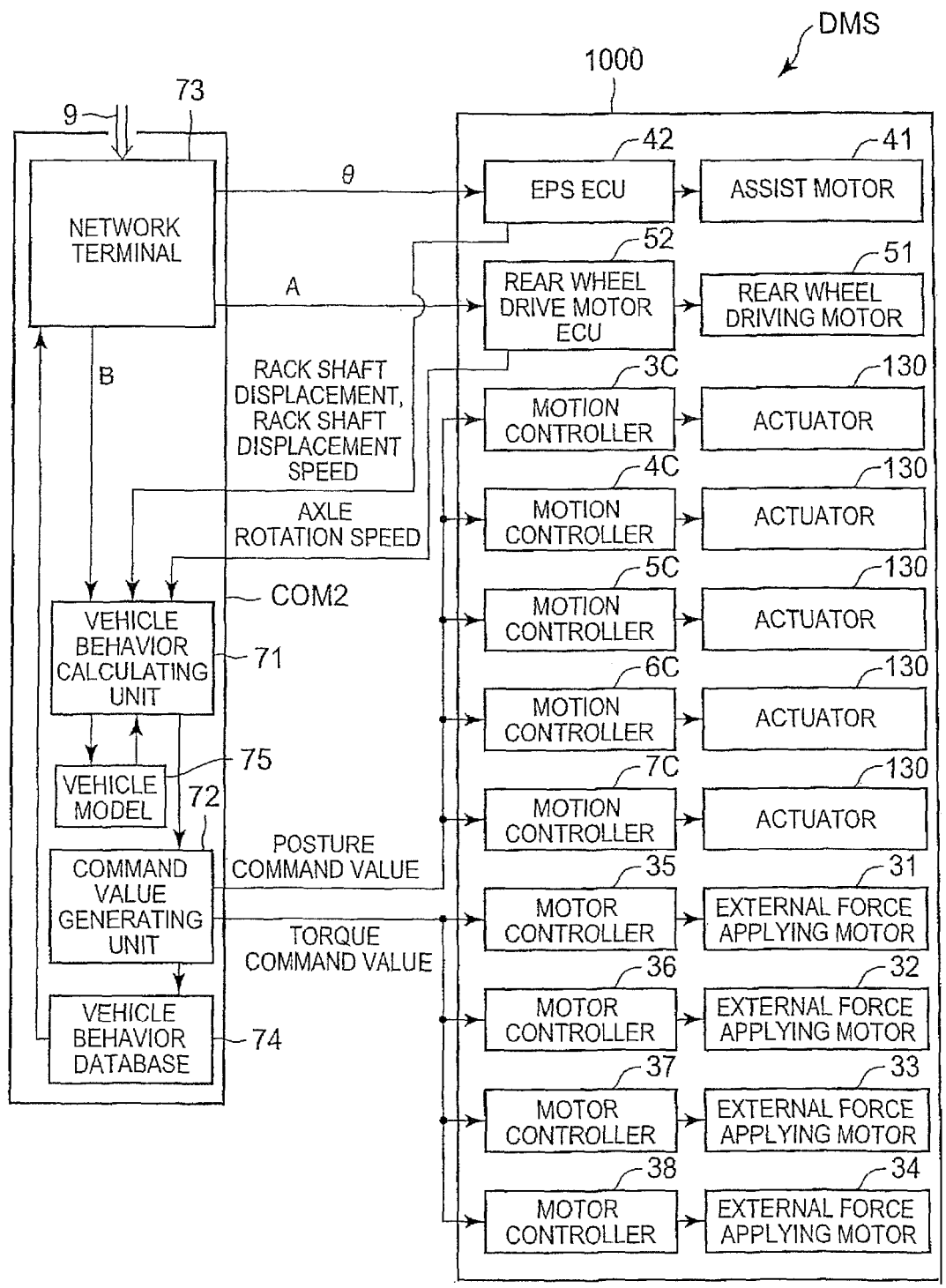
FIG. 17 is a block diagram schematically illustrating an electrical configuration of the vehicle test apparatus DMS.

FIG. 17 is a block diagram schematically illustrating an electric configuration of the vehicle test apparatus DMS. The vehicle test apparatus DMS includes a computer COM2 and a body portion 1000 of the vehicle test apparatus DMS. The assist motor 41, the EPS ECU 42 that controls the assist motor 41, the rear wheel driving motor 51, a rear wheel driving motor ECU 52 that controls the rear wheel driving motor 51, the motion controllers 3C, 4C, 5C, 6C, and 7C that drive the motion bases 3, 4, 5, 6, and 7, respectively, and the motor controllers 35, 36, 37, and 38 are mounted on the body portion 1000 of the vehicle test apparatus DMS. The motor controllers 35, 36, 37, and 38 are devices that drive the external force applying motors 31, 32, 33, and 34, respectively.

The computer COM2 connected to the computer COM1 (see FIG. 13) of the driving simulator DS via the communication line 9 is a device that controls the motion controllers 3C, 4C, 5C, 6C, and 7C for the motion bases 3, 4, 5, 6, and 7 of the vehicle test apparatus DMS and the motor controllers 35, 36, 37, and 38 mounted on the vehicle test apparatus DMS. The control function of the computer COM2 is implemented by a program installed in the computer.

The EPS ECU 42 includes a linear displacement sensor (not illustrated) that detects a displacement in the axial direction of the rack shaft. The rear wheel driving motor ECU 52 includes a rotation angle sensor (not illustrated) that detects both or one rotation angle of the axles 23S and 24S of the rear wheels. The data pieces such as the steering angle θ, the depression amount A of the accelerator pedal, and the depression force B of the brake pedal corresponding to the driver's driving operation are input to a network terminal 73 from the driving simulator DS via the communication line 9. The data on the steering angle θ is supplied to the EPS ECU 42 mounted on the vehicle test apparatus DMS. The data on the depression amount A of the accelerator pedal is supplied to the rear wheel driving motor ECU 52 mounted on the vehicle test apparatus DMS. The data piece on the depression force B of the brake pedal is supplied to a vehicle behavior calculating unit 71 of the computer COM2.

The EPS ECU 42 determines the steering torque on the basis of the data on the steering angle θ supplied from the driving simulator DS and controls the driving of the assist motor 41 on the basis of the determined steering torque. The EPS ECU 42 measures a displacement of the rack shaft included in the EPS 40 in the axial direction (hereinafter, referred to as a "rack shaft displacement") and a displacement speed of the rack shaft in the axial direction (hereinafter, referred to as a "rack shaft displacement speed") on the basis of the output signal of the linear displacement sensor and sends the measured values to the computer COM2.

The rear wheel driving motor ECU 52 determines a torque command value for the rear wheel driving motor 51 on the basis of the data on the depression amount A of the accelerator pedal supplied from the driving simulator DS and controls the driving of the rear wheel driving motor 51 on the basis of the determined torque command value. The rear wheel driving motor ECU 52 measures the rotation speeds (hereinafter, referred to as an "axle rotation speed") of the axles 23S and 24S of the rear wheels on the basis of the output signal of the rotation angle sensor and sends the measured values to the computer COM2.

The computer COM2 includes the network terminal 73, the vehicle behavior calculating unit 71, a command value generating unit 72, and a vehicle behavior database 74. The vehicle behavior calculating unit 71 performs a calculating operation using software such as a vehicle model 75. Here, the vehicle model 75 is software configured to simulate the behavior of a real vehicle having the test pieces mounted thereon, and is a model that generates position and posture of the vehicle body, position and posture of the vehicle wheels and the external forces applied to the axles, which correspond to the driving condition, on the basis of the data pieces such as the depression force B of the brake pedal, the rack shaft displacement, the rack shaft displacement speed, and the axle rotation speed acquired from the driving simulator DS.

The brake depression force information acquired from the network terminal 73, the rack shaft displacement and the rack shaft displacement speed sent from the EPS ECU 42, and the axle rotation speed sent from the rear wheel driving motor ECU 52 are input to the vehicle behavior calculating unit 71. The vehicle behavior calculating unit 71 generates the position and posture of the vehicle body, the position and posture of the vehicle wheels, and the external forces applied to the axles, which correspond to the driving condition simulated by the driving simulator DS, on the basis of the input information using the vehicle model 75.

The command value generating unit 72 generates posture command values for the motion bases 3, 4, 5, 6, and 7 on the basis of the data on the position and posture of the vehicle body and the position and posture of the vehicle wheels generated by the vehicle behavior calculating unit 71 in each predetermined cycle. The command value generating unit 72 generates the torque command values for the external force applying motors 34, 35, 36, and 37 on the basis of the external forces applied to the axles and generated by the vehicle behavior calculating unit 71.

The vehicle behavior database 74 is a storage device that stores the output data such as the posture command values and the torque command values generated by the command value generating unit 72 as a database. The posture command values for the motion bases 3, 4, 5, 6, and 7 generated by the command value generating unit 72 are sent to the vehicle behavior database 74. The posture command values are also sent to the motion controllers 3C, 4C, 5C, 6C, and 7C for the corresponding motion bases 3, 4, 5, 6, and 7. The motion controllers 3C, 4C, 5C, 6C, and 7C control the corresponding actuators 130 on the basis of the posture command values sent from the command value generating unit 72. Accordingly, the moving bases 120 of the motion bases 3, 4, 5, 6 and 7 move so as to be in postures corresponding to the posture command values.

The torque command values for the external force applying motors 31, 32, 33, and 34 generated by the command value generating unit 72 are sent to the vehicle behavior database 74. The torque command values are also sent to the corresponding motor controllers 35, 36, 37, and 38. The motor controllers 35, 36, 37, and 38 control the corresponding external force applying motors 31, 32, 33, and 34 on the basis of the torque command values sent from the command value generating unit 72. Accordingly, motor torques corresponding to the torque command values are generated from the external force applying motors 31, 32, 33, and 34.

According to the embodiment of the invention, in the driving simulator DS, the input devices such as the steering wheel 91, the accelerator pedal 92, the brake pedal 93, and the shift lever 94 are operated, and a preliminary behavior estimating test is performed so as to estimate the vehicle behavior in all steering input patterns. The output data such as the posture command values or the torque command values generated by the command value generating unit 72 are stored and accumulated in the vehicle behavior database 74 of the vehicle test apparatus DMS in correspondence with the plural operation data pieces such as the brake depression force B, the rack shaft displacement, the rack shaft displacement speed, and the axle rotation speed, which indicate contents of the vehicle operation signal.

In the preliminary behavior estimating test, (1) a driver in the driving simulator DS may actually operate the input devices, and the data such as the steering angle θ, the depression amount A of the accelerator pedal, and the brake depression force B based on the driver's driving operation may be transmitted to the vehicle test apparatus DMS via the communication line 9; or (2) the computer COM1 of the driving simulator DS may simulatively generate the signals to be output if the input devices are operated and the generated signals may be transmitted to the vehicle test apparatus DMS.

When the preliminary behavior estimating test ends, the data pieces such as the posture command values or the torque command values have been accumulated in the vehicle behavior database 74, and thus, these data pieces are transmitted to the vehicle behavior database 62 installed in the computer COM1 illustrated in FIG. 16. The transmission method is not particularly limited. For example, the data in the vehicle behavior database 74 may be transmitted or copied via the communication line 9 or via a portable memory when the preliminary behavior estimating test ends, or two vehicle behavior databases 74 and 62 may be interactively synchronized via the communication line 9 during the preliminary behavior estimating test.

Therefore, the driving simulator DS can be operated using the vehicle behavior database 62 regardless of whether the driving simulator and the vehicle test apparatus perform data communication therebetween in real time during operation of the driving simulator. In order to operate the driving simulator to collect test data pieces on the test pieces, the output data such as the posture command values or the torque command values generated by the command value generating unit 72 may be stored and accumulated in the vehicle behavior database 74 by performing data communication between the driving simulator and the vehicle test apparatus in real time.

According to the invention, the driving simulator is operated using the vehicle behavior database 62 of the driving simulator instead of feeding back and using the vehicle behavior data in real time during operation the driving simulator. As a result, even in a state where a considerable delay occurs in the data communication between the driving simulator DS and the vehicle test apparatus DMS, it is possible to improve followability of data, and thus the driving simulator DS can accurately simulate the state of the test piece-mounting vehicle body 2 including the test pieces.

The invention is not limited to the above-mentioned embodiments, and various modifications may be made to the above-described embodiments without changing the scope of the invention.

What is claimed is:

1. A test system for automobiles, comprising:
a first actual machine that is installed in a first location, and that is a mechanical element of a vehicle;
a second actual machine that is another mechanical element coupled to the first actual machine, the second actual machine being installed in a second location away from the first location;
a first simulated machine that is installed in the first location, and simulates an operation of the second actual machine;
a second simulated machine that is installed in the second location, and simulates an operation of the first actual machine, the second actual machine and the second simulated machine being mechanically coupled to each other, the first simulated machine and the first actual machine being mechanically coupled to each other, and the first simulated machine, the second actual machine, the second simulated machine, and the first actual machine being connected to a network so that data communication is performed and an operation test is performed;
a first data processor that is connected to the first simulated machine and acquires data from the second actual machine via the network in each communication cycle; and
a second data processor that is connected to the second simulated machine and acquires data from the first actual machine via the network in each communication cycle,
wherein the first data processor calculates an estimated value used for performing interpolation on the data acquired in each communication cycle, and
wherein the second data processor calculates an estimated value used for performing interpolation on the data acquired in each communication cycle.

2. The test system according to claim 1, wherein
the test system is a vehicle test system;
the vehicle test system includes the first actual machine and the first simulated machine, and the second simulated machine which is connected with the first actual machine and the first simulated machine via the communication line, and in which the second actual machine is mounted, the second actual machine being a mechanical element of the vehicle;
the first actual machine and the first simulated machine include a transmitter unit that transmits a vehicle operation signal to the second simulated machine;
the second simulated machine includes a receiver unit that receives the vehicle operation signal, a vehicle behavior calculating unit that is the second data processor, and that operates the second actual machine based on a content of the received vehicle operation signal so as to input measurement data, which is obtained by measuring a motion of the second actual machine, to a vehicle model, and to acquire output data, and a vehicle behavior database that stores vehicle behavior data including operation data indicating the content of the vehicle operation signal and the output data corresponding to the operation data;
the second simulated machine transmits the vehicle behavior data stored in the vehicle behavior database to the first actual machine and the first simulated machine;
the first actual machine and the first simulated machine are operated using the transmitted vehicle behavior data in response to a driver's vehicle operation; and
the first data processor calculates the estimated value using a vehicle behavior database stored in the first data processor.

3. The test system according to claim 1, wherein:
the first data processor calculates a control target value for the first simulated machine using the data on the second actual machine on which the interpolation has been performed using the estimated value, and controls the first simulated machine using the calculated control target value; and
the second data processor calculates a control target value for the second simulated machine using the data on the first actual machine on which the interpolation has been performed using the estimated value, and controls the second simulated machine using the calculated control target value.

4. The test system according to claim 3, wherein when the data acquired from the second actual machine is different from the estimated value by a threshold value or greater, the first data processor calculates the control target value using only the data acquired from the second actual machine.

5. The test system according to claim 4, wherein the first data processor transmits the calculated control target value to the second data processor and the second data processor controls the second simulated machine using the received control target value.

6. The test system according to claim 5, wherein the first data processor transmits a flag indicating an abnormal state together with the calculated control target value, to the second data processor.

* * * * *